US011949341B2

(12) United States Patent
Fukuda et al.

(10) Patent No.: US 11,949,341 B2
(45) Date of Patent: Apr. 2, 2024

(54) POWER CONVERTER AND ELECTRIC MOTOR BRAKING METHOD

(71) Applicant: TOSHIBA MITSUBISHI-ELECTRIC INDUSTRIAL SYSTEMS CORPORATION, Chuo-ku (JP)

(72) Inventors: Masashi Fukuda, Tokyo (JP); Shunsuke Tobayashi, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 335 days.

(21) Appl. No.: 17/310,302

(22) PCT Filed: Jun. 14, 2019

(86) PCT No.: PCT/JP2019/023697
§ 371 (c)(1),
(2) Date: Jul. 27, 2021

(87) PCT Pub. No.: WO2020/250429
PCT Pub. Date: Dec. 17, 2020

(65) Prior Publication Data
US 2022/0321021 A1    Oct. 6, 2022

(51) Int. Cl.
*H02M 5/458* (2006.01)
*H02M 1/00* (2006.01)
*H02P 3/18* (2006.01)

(52) U.S. Cl.
CPC ......... *H02M 5/458* (2013.01); *H02M 1/0009* (2021.05); *H02P 3/18* (2013.01)

(58) Field of Classification Search
CPC ...... H02M 5/458; H02M 1/0009; H02M 7/49; H02P 3/18; H02P 3/22

(Continued)

(56) References Cited

U.S. PATENT DOCUMENTS

| 8,120,294 B2 * | 2/2012 | Ibori ...................... H02M 1/32 363/34 |
| 8,305,018 B2 * | 11/2012 | Okamura ................ B60L 53/00 320/133 |
| 10,236,805 B2 * | 3/2019 | Becerra .................. H02M 5/458 |

FOREIGN PATENT DOCUMENTS

| JP | 8-19266 A | 1/1996 |
| JP | 9-255246 A | 9/1997 |

(Continued)

OTHER PUBLICATIONS

Indian Office Action dated Mar. 29, 2022 in Indian Patent Application No. 202117034033, 6 pages.

(Continued)

*Primary Examiner* — David Luo
(74) *Attorney, Agent, or Firm* — Oblon, McClelland, Maier & Neustadt, L.L.P.

(57) ABSTRACT

A power converter including a diode converter, an inverter, a smoothing capacitor, a resistor; a current sensor; an estimation unit; and a control unit. The diode converter rectifies an alternating current from a power supply. The inverter is formed such that a DC side is connected to a DC output of the diode converter and an AC side is connected to an electric motor and includes a semiconductor switching element which converts DC power on the DC side into AC power and a reverse connection diode which is connected in antiparallel with the semiconductor switching element. The smoothing capacitor is provided in the DC output of the diode converter. The resistor is connected in parallel with the smoothing capacitor. The current sensor detects a load current flowing between the inverter and the electric motor.

6 Claims, 4 Drawing Sheets

(58) Field of Classification Search
USPC .................................................. 318/362, 376
See application file for complete search history.

(56) References Cited

FOREIGN PATENT DOCUMENTS

| | | |
|---|---|---|
| JP | 2002-171695 A | 6/2002 |
| JP | 4538359 B2 | 10/2006 |
| JP | 5511515 B2 | 9/2010 |
| JP | 2012-10488 A | 1/2012 |
| JP | 2012-205391 A | 10/2012 |

OTHER PUBLICATIONS

International Search Report dated Jul. 23, 2019 in PCT/JP2019/023697 filed Jun. 14, 2019, 2 pages.

* cited by examiner

POWER CONVERTER AND ELECTRIC MOTOR BRAKING METHOD

TECHNICAL FIELD

The present invention relates to a power converter and an electric motor braking method.

BACKGROUND ART

A power converter supplies AC power converted from DC power to an electric motor and drives an electric motor and a mechanical load interlocked with the rotation of the electric motor. When the electric motor and the mechanical load are braked in a rotation state, regenerative energy is generated by an electromotive force. When the regenerative energy flows from the electric motor to the power converter, a voltage on a DC side (a DC voltage) of the power converter increases. In that case, it may be difficult to quickly stop the electric motor when a discharge circuit is used to avoid the occurrence of an overvoltage state of the DC voltage.

CITATION LIST

Patent Literature

[Patent Literature 1]
Japanese Unexamined Patent Application, First Publication No. Hei 09-255246

SUMMARY OF INVENTION

Technical Problem

An object of the present invention is to provide a power converter and an electric motor braking method capable of braking an electric motor more quickly.

Solution to Problem

A power converter according to an aspect of an embodiment includes: a diode converter; an inverter; a smoothing capacitor; a resistor; a current sensor; an estimation unit; and a control unit. The diode converter rectifies an alternating current from a power supply. The inverter is formed such that a DC side is connected to a DC output of the diode converter and an AC side is connected to an electric motor and includes a semiconductor switching element which converts DC power on the DC side into AC power and a reverse connection diode which is connected in antiparallel with the semiconductor switching element. The smoothing capacitor is provided in the DC output of the diode converter. The resistor is connected in parallel with the smoothing capacitor. The current sensor detects a load current flowing between the inverter and the electric motor. The estimation unit calculates an estimation value of the DC voltage Vdc on the DC side on the basis of a current value I detected by the current sensor. The control unit controls the inverter so that the estimation value of the DC voltage Vdc on the DC side does not exceed a predetermined reference voltage during a period in which the electric motor is in a regenerative state.

DESCRIPTION OF EMBODIMENTS

Figure 1:
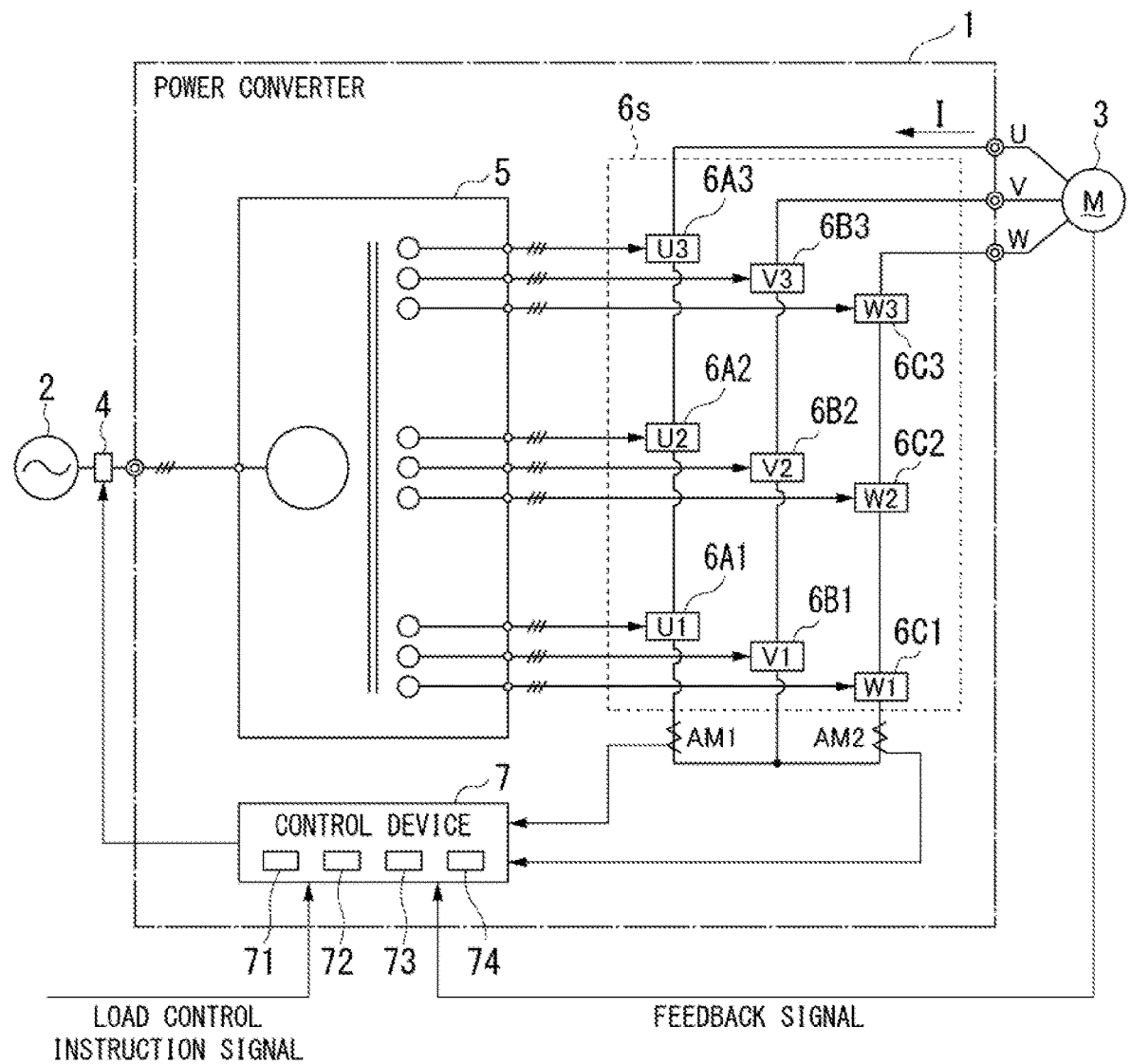
FIG. 1 is a diagram showing an example of a power converter according to a first embodiment.

Hereinafter, a power converter of an embodiment will be described with reference to the drawings. Additionally, in the following description, the same reference numerals are given to the components having the same or similar functions. Further, redundant description of the components may be omitted. Furthermore, in the drawings referred to below, control gate wirings and the like may be omitted for convenience of description.

Here, a "positive electrode P" and a "negative electrode N" are defined first. "Positive electrode P" means a portion having a positive potential when a power converter 1 is operated. "Negative electrode N" means a portion having a negative potential when the power converter 1 is operated.

Additionally, a reference voltage Vdc0 of a DC link in the power converter 1 is defined as a predetermined voltage. The reference voltage Vdc0 is, for example, a voltage between the positive electrode P and the negative electrode N. The reference voltage Vdc0 is sometimes called a DC (DC link) rated voltage.

Figure 2:
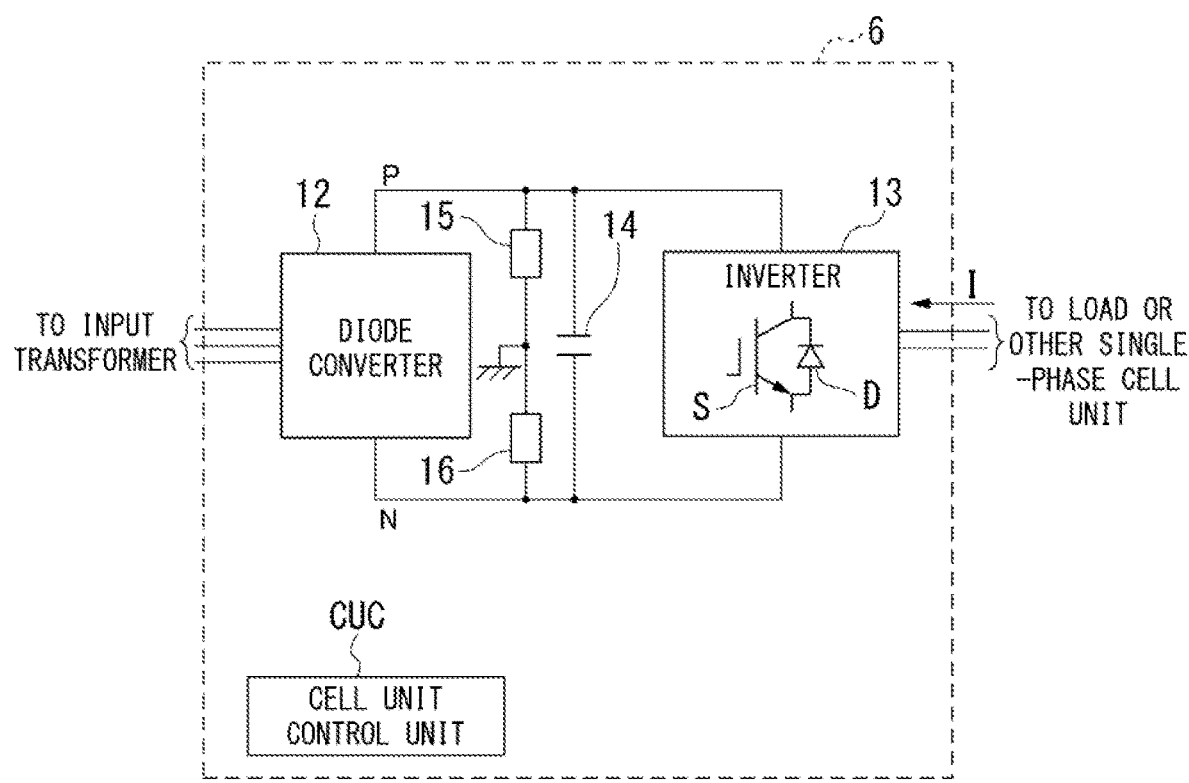
FIG. 2 is a diagram showing a cell unit of an embodiment.
Figure 3:
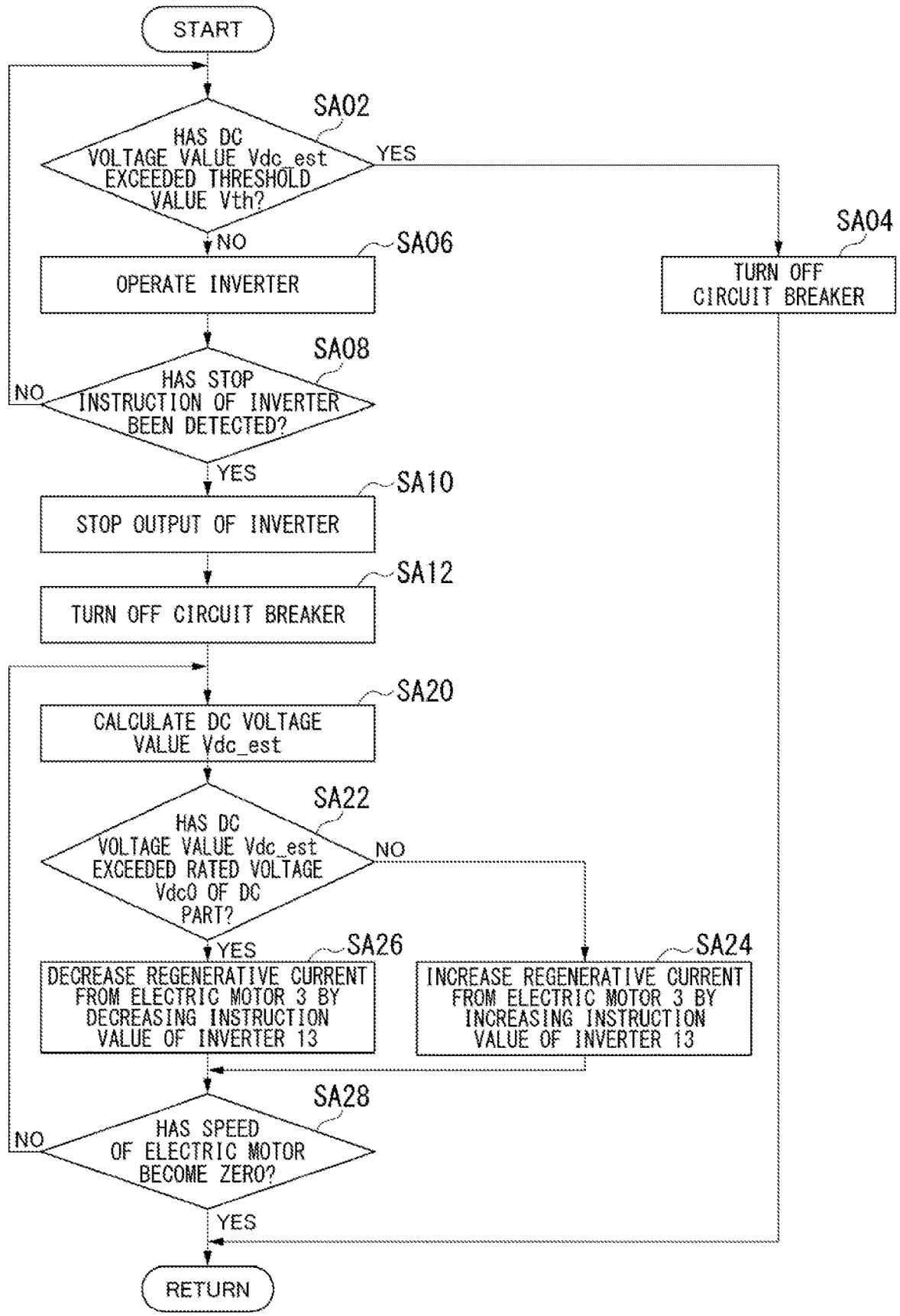
FIG. 3 is a flowchart of a process relating to braking control of an embodiment.

Referring to FIGS. 1 to 3, the power converter 1 of the embodiment will be described.

The power converter 1 converts AC power supplied from an AC power supply 2 into DC power, converts the converted DC power into AC power having a desired frequency and voltage, and supplies the AC power to an electric motor 3. The electric motor 3 is, for example, a three-phase induction motor, but is not limited thereto.

The power supply side of the power converter 1 is connected to the AC power supply 2 via a circuit breaker 4. The circuit breaker 4 interrupts the power supplied from the AC power supply 2 (the power supply) on the basis of the control of a control device 7 to be described later. Additionally, as shown in FIG. 1, the circuit breaker 4 may be separated from the power converter 1 or may be a part of the power converter 1.

In this embodiment, an example in which the power converter 1 includes a plurality of cell units 6s will be described. Additionally, the power converter 1 may include a three-phase converter and a three-phase inverter instead of the plurality of cell units 6s.

First, the overall electrical configuration of the power converter 1 will be described. FIG. 1 is a diagram showing an example of the power converter 1 of the embodiment. In FIG. 1, an electric circuit system is indicated by a single line and switches and the like are not shown. The power converter 1 includes, for example, an input transformer 5, a plurality of cell units 6s, a control device 7, and a current sensor AM.

The AC power is supplied from the AC power supply 2 to the input transformer 5. The input transformer 5 transforms the voltage of the AC power supplied from the AC power supply 2 (primary voltage) into a desired secondary voltage and supplies the AC power of the secondary voltage to each of the plurality of cell units 6s. The input transformer 5 includes a primary coil and a plurality of groups of coils (secondary coils) insulated from each other. The primary coil and the secondary coil are also insulated.

The plurality of cell units 6s include, for example, three first-phase load cell units 6A1, 6A2, and 6A3 (U1, U2, and U3 in the drawings), three second-phase load cell units 6B1, 6B2, and 6B3 (V1, V2, and V3 in the drawings), and three third-phase load cell units 6C1, 6C2, and 6C3 (W1, W2, and W3 in the drawings). The cell units 6A1, 6A2, 6A3, 6B1, 6B2, 6B3, 6C1, 6C2, and 6C3 have the same circuit configuration and will be simply referred to as the cell unit 6 when they are described without distinction. Each cell unit 6 converts the three-phase AC power supplied from the secondary coil of the input transformer 5 into DC power, converts the converted DC power into AC power having a desired frequency and voltage, and outputs the AC power.

For example, a first group of the secondary side of the input transformer 5 is connected to the input of the cell unit 6A1. A second group of the secondary side of the input transformer 5 is connected to the input of the cell unit V1. A third group of the secondary side of the input transformer 5 is connected to the input of the cell unit W1. A fourth group of the secondary side of the input transformer 5 is connected to the input of the cell unit 6A2. A fifth group of the secondary side of the input transformer 5 is connected to the input of the cell unit 6B2. A sixth group of the secondary side of the input transformer 5 is connected to the input of the cell unit 6C2. A seventh group of the secondary side of the input transformer 5 is connected to the input of the cell unit 6A3. An eighth group of the secondary side of the input transformer 5 is connected to the input of the cell unit 6B3. A ninth group of the secondary side of the input transformer 5 is connected to the input of the cell unit 6C3.

In this embodiment, the outputs of the cell units 6A1, 6A2, and 6A3 are electrically connected in series in the shown order. An output terminal of the cell unit 6A3 which is not connected to the cell unit 6A2 is connected to the first phase (U phase) of the electric motor 3. An output terminal of the cell unit 6A1 which is not connected to the cell unit 6A2 is connected to a neutral point. In this embodiment, the outputs of the cell units 6B1, 6B2, and 6B3 are electrically connected in series in the shown order. An output terminal of the cell unit 6B3 which is not connected to the cell unit 6B2 is connected to the second phase (V phase) of the electric motor 3. An output terminal of the cell unit 6B1 which is not connected to the cell unit 6B2 is connected to a neutral point. In this embodiment, the outputs of the cell units 6C1, 6B2, and 6B3 are electrically connected in series in the shown order. An output terminal of the cell unit 6C3 which is not connected to the cell unit 6C2 is connected to the third phase (W phase) of the electric motor 3. An output terminal of the cell unit 6C1 which is not connected to the cell unit 6C2 is connected to a neutral point. Accordingly, the power converter 1 can supply a large amount of AC power to the electric motor 3.

A current sensor AM1 and a current sensor AM2 detect a load current (a phase current) flowing between the electric motor 3 and the inverter 13 (FIG. 2) of the power converter 1. For example, the current sensor AM1 is provided on the first phase of the AC output and the current sensor AM2 is provided on the third phase of the AC power. Since the second-phase current of the AC output can be obtained from the values of the current sensor AM1 and the current sensor AM2, the second-phase current can be omitted. Additionally, when the current sensor AM1 and the current sensor AM2 are not distinguished from each other, they may be simply referred to as a current sensor AM. A current value detected by the current sensor AM may be referred to as a current I.

The control device 7 controls or protects each cell unit 6. The control device 7 includes, for example, a storage unit 71, an operation control unit 72, an estimation unit 73, and a braking control unit 74.

The storage unit 71 stores a variety of data relating to the control of the plurality of cell units 6s. The variety of data includes, for example, a limit value (a threshold value Vth) for limiting the overvoltage of the DC voltage of the cell unit 6, a reference voltage Vdc0 of the DC voltage of the cell unit 6, history data and integrated value data of a current value I detected by the current sensor AM, an estimation value of a DC voltage value Vdc of the cell unit 6 (hereinafter, referred to as a DC voltage value Vdc_est), and the like. The threshold value Vth is defined as, for example, the upper-limit value of the DC voltage of the DC link. The reference voltage Vdc0 is an example of the control target voltage.

The operation control unit 72 generates a control signal for controlling a switching element 13S (FIG. 2) included in each cell unit 6 on the basis of data stored in the storage unit 71, for example, information representing the DC voltage value Vdc_est and information representing the current I detected by the current sensor AM. The operation control unit 72 controls each cell unit 6 by sending the generated control signal to each cell unit 6. The operation control unit 72 acquires a signal representing the control state of the electric motor 3 (for example, a feedback signal of a rotation speed) and controls each cell unit 6 on the basis of the feedback signal. Further, the control device 7 acquires a control instruction signal of the electric motor 3 from other devices and controls each cell unit 6 on the basis of the control instruction signal.

The estimation unit 73 calculates the DC voltage value Vdc_est on the basis of the current value I detected by the current sensor AM. The calculation of the DC voltage value Vdc_est will be described below.

The braking control unit 74 controls each unit to brake the electric motor 3 while adjusting the DC voltage Vdc not to exceed the reference voltage Vdc0 on the basis of the DC voltage value Vdc_est. For example, the braking control unit 74 opens the circuit breaker 4 at a desired timing associated with the braking control of the electric motor 3. This desired timing may be matched when the electric motor 3 is in the regenerative state.

Further, the braking control unit 74 controls the inverter 13 so that more AC power is supplied from the electric motor 3 to the inverter 13 during a period in which the electric motor 3 is in the regenerative state. At that time, the braking control unit 74 adjusts the DC voltage value Vdc_est not to exceed the reference voltage Vdc0 on the DC side. The control of the circuit breaker 4 and the inverter 13 will be described in detail later.

Next, the cell unit 6 will be described.

FIG. 2 is a diagram showing the cell unit 6 of the embodiment. The cell unit 6 includes, for example, a diode converter 12, an inverter 13, a smoothing capacitor 14, resistors 15 and 16, and a cell unit control unit CUC. The DC output of the diode converter 12 and the DC input of the inverter 13 are electrically connected with each other via a DC link between the positive electrodes (P) and between the negative electrodes (N). The smoothing capacitor 14 is provided in the DC link and the terminal of the smoothing capacitor 14 is electrically connected to the positive electrode and the negative electrode of the DC link.

In the following description, the cell unit 6A1 will be illustrated and an example thereof will be described while showing the connection relationship with the outside. The same applies to the other cell units 6.

The diode converter 12 is a three-phase AC input type forward converter and the input portion is electrically connected to one group of the secondary side of the input transformer 5. The diode converter 12 converts the AC power input from the input transformer 5 into the DC power by rectifying the alternating current. The smoothing capacitor 14 smoothes the converted DC voltage.

The inverter 13 is a single-phase AC output type inverse converter. The inverter 13 includes, for example, the switching element 13S which converts the DC power on the DC side into the AC power and a reverse connection diode 13D which is connected in antiparallel with the switching element 13S. The switching element 13S is an example of the semiconductor switching element. In the inverter 13, the DC side is connected to the DC output of the diode converter 12 and the AC side is connected in series with the output of the electric motor 3 or another cell unit 6. The inverter 13 outputs, for example, the converted AC power to the first phase of the electric motor 3.

The resistors 15 and 16 are connected in series with each other and both ends connected in series with each other are connected in parallel to the smoothing capacitor 14. The connection point of the resistors 15 and 16 is connected to the frame of the cell unit 6. The resistors 15 and 16 discharge the electric charge accumulated in the smoothing capacitor 14.

The cell unit control unit CUC generates a signal for controlling a switching element constituting the diode converter 12 and the inverter 13 on the basis of a gate pulse signal from the control device 7. The gate pulse signal from the control device 7 is given to the switching element constituting the diode converter 12 and the inverter 13 via the cell unit control unit CUC.

FIG. 3 is a flowchart of a process associated with the braking control of the embodiment.

For example, the initial value of the DC voltage value Vdc_est is defined as 0. A series of processes shown in the drawing is repeatedly performed at predetermined intervals.

First, the braking control unit 74 determines whether or not the DC voltage value Vdc_est exceeds the threshold value Vth (step SA02). Additionally, the DC voltage value Vdc_est is calculated in the previous process cycle.

When the DC voltage value Vdc_est exceeds the threshold value Vth, the braking control unit 74 turns off the circuit breaker 4 (step SA04) and ends a series of processes in the current cycle.

When the DC voltage value Vdc_est does not exceed the threshold value Vth, the braking control unit 74 operates the inverter 13 without turning off the circuit breaker 4 (step SA06).

Next, the braking control unit 74 determines whether or not the stop instruction of the inverter 13 from the host device is detected (step SA08). When the stop instruction of the inverter 13 from the host device is not detected, the braking control unit 74 advances the process to step SA02.

When the stop instruction of the inverter 13 from the host device is detected, the braking control unit 74 stops the output of the inverter 13 (step SA10). Next, the braking control unit 74 turns off the circuit breaker 4 (step SA12).

Next, the estimation unit 73 calculates the DC voltage value Vdc_est using the following formula (1) (step SA20). For example, the DC voltage value Vdc_est is defined by the following formula (1).

[Math. 1]

$$\text{Vdc\_est} = Vdc0 \cdot e^{-\frac{t}{RC}} + 1/C \cdot \int Ir(t)dt \quad (1)$$

The variables in formula (1) are as follows.
Vdc0: Reference voltage of DC part
R: Resistance value of DC part
C: Capacitor of DC part
t: Time
Ir(t): Regenerative current flowing from electric motor 3 to inverter 13 at time t In the case of the cell unit 6 of the embodiment, the resistance value becomes the sum of the resistance values of the resistor 15 and the resistor 16. The capacitor C becomes the capacity of the smoothing capacitor 14. Additionally, when the smoothing capacitor 14 is configured as a combination of capacitors connected in parallel with each other, the capacitor C becomes the sum of the capacities of the plurality of capacitors.

The first term on the right side of the above-described formula (1) sets the reference voltage Vcd0 of the DC part as the initial value and defines a discharge characteristic according to a time constant RC defined by the resistance value R of the DC part and the capacitor C of the DC part. The second term defines a change in voltage due to the charging of the capacitor C of the DC part charged by the regenerative current Ir(t). By adding the first term and the second term, the voltage applied to the capacitor C, that is, the terminal voltage of the smoothing capacitor 14 (the DC voltage of the DC link) is derived.

When the terminal voltage of the smoothing capacitor 14 can be controlled to be lower than the reference voltage Vcd0 of the DC part, an overvoltage does not occur in the DC part. That is, the occurrence of the overvoltage can be suppressed by adjusting the regenerative current Ir(t) to satisfy the following formula (2).

[Math. 2]

$$Vdc0 > Vdc0 \cdot e^{-\frac{t}{RC}} + 1/C \cdot \int Ir(t)dt \quad (2)$$

As described above, the right side of formula (2) is the same as the right side of formula (1). Here, the braking control unit 74 determines whether or not the DC voltage value Vdc_est derived by the calculation using formula (1) exceeds the predetermined reference voltage Vdc0 of the DC part (step SA22). This determination corresponds to the determination of whether the condition of formula (2) is satisfied. Accordingly, the braking control unit 74 can indirectly detect the charging state of the smoothing capacitor 14. Additionally, the integration of the regenerative current Ir(t) may be calculated by using the integrated value of Ir(t) for a predetermined period. For example, the predetermined period may be set to a range that is a natural number multiple of the basic cycle of the AC output of the inverter 13.

When the DC voltage value Vdc_est does not exceed the reference voltage Vdc0 of the DC part, the braking control unit 74 controls the regenerative current from the electric motor 3 to increase by increasing the instruction value of the inverter 13 (step SA24). Accordingly, the braking control unit 74 can allow more current to flow from the side of the electric motor 3 to the inverter 13 by increasing the DC voltage value Vdc estimated to have a margin until the overvoltage state not to exceed the reference voltage Vdc0. Additionally, it is conceived that the instruction value of the inverter 13 is to define the regeneration amount and the regeneration amount increases in accordance with an increase in the instruction value.

When the DC voltage value Vdc_est exceeds the set value (the threshold value) Vdc0, the braking control unit 74 controls the regenerative current from the electric motor 3 to decrease by decreasing the instruction value of the inverter 13 (step SA26). Accordingly, the braking control unit 74 can decrease the current flowing from the side of the electric motor 3 to the inverter 13 to decrease the DC voltage value Vdc estimated to be in the overvoltage state.

When the process of SA24 or SA26 ends, the braking control unit 74 determines whether the speed of the electric motor 3 is zero (step SA28). The braking control unit 74 repeats the process from step SA20 when the speed of the electric motor 3 is not zero. The braking control unit 74 ends a series of processes of the current cycle when the speed of the electric motor 3 is zero. Additionally, the speed of the electric motor 3 when the speed becomes lower than the speed defined by the threshold value may be regarded as zero by determining the speed of the electric motor 3 using the threshold value in the vicinity of zero instead of determining whether or not the speed of the electric motor 3 is zero.

According to the above-described embodiment, the estimation unit 73 calculates the DC voltage value Vdc_est on the basis of the detection value (the current value I) of the load current flowing between the inverter 13 and the electric motor 3 when braking the electric motor 3. The braking control unit 74 controls the inverter 13 so that the DC voltage value Vdc_est does not exceed the reference voltage Vdc0 during a period in which the electric motor 3 is in the regenerative state. Accordingly, it is possible to brake the electric motor 3 more quickly.

The braking control unit 74 brakes the electric motor 3 by detecting the stop instruction of the inverter 13 from the host device using the above-described control, and controls the inverter 13 so that the DC voltage value Vdc_est does not exceed the reference voltage Vdc0 during the braking operation. Accordingly, it is possible to suppress the overvoltage state due to the braking control.

The braking control unit 74 can interrupt the power flowing from the AC power supply 2 via the diode converter 12 by opening the circuit breaker 4 at a desired timing associated with the braking control of the electric motor 3. Accordingly, for example, when the circuit breaker 4 is opened during a period in which the electric motor 3 is in the regenerative state, the DC voltage value Vdc_est can be controlled not to exceed the reference voltage Vdc0.

Additionally, the estimation unit 73 may detect that the electric motor 3 is in the regenerative state, on the basis of the current value I detected by the current sensor AM. In that case, the estimation unit 73 can detect the inflow of regenerative energy from the electric motor 3 to the inverter 13 by detecting the inflow of active power from the electric motor 3 on the basis of the current value I detected by the current sensor AM.

The braking control unit 74 may control a change in the DC voltage Vdc on the basis of the DC voltage value Vdc_est calculated by the estimation unit 73. In this case, the braking control unit 74 controls the inverter 13 so that the DC voltage value Vdc_est does not exceed the reference voltage Vdc0. At that time, the braking control unit 74 may control the inverter 13 so that more AC power is supplied from the electric motor 3 to the inverter 13 in a range in which the DC voltage value Vdc_est does not exceed the reference voltage Vdc0 on the DC side. Accordingly, it is possible to brake the electric motor 3 more quickly while suppressing the overvoltage of the DC voltage Vdc.

In the above-described embodiment, since the DC voltage value Vdc_est can be calculated on the basis of the above-described formula (1) without providing a voltage detector for detecting the DC voltage Vdc on the DC side for each cell unit 6, the configuration of the power converter 1 can be simplified. For example, a sensor collecting data for calculating the DC voltage value Vdc_est may be at least two current sensors AM.

Second Embodiment

Referring to FIGS. 1 to 4, a second embodiment will be described. In the first embodiment, an example in which the resistors 15 and 16 have fixed values has been described. In this embodiment, an example in which the resistance value R in formulas (1) and (2) is adjusted according to the state of the system will be described.

Figure 4:
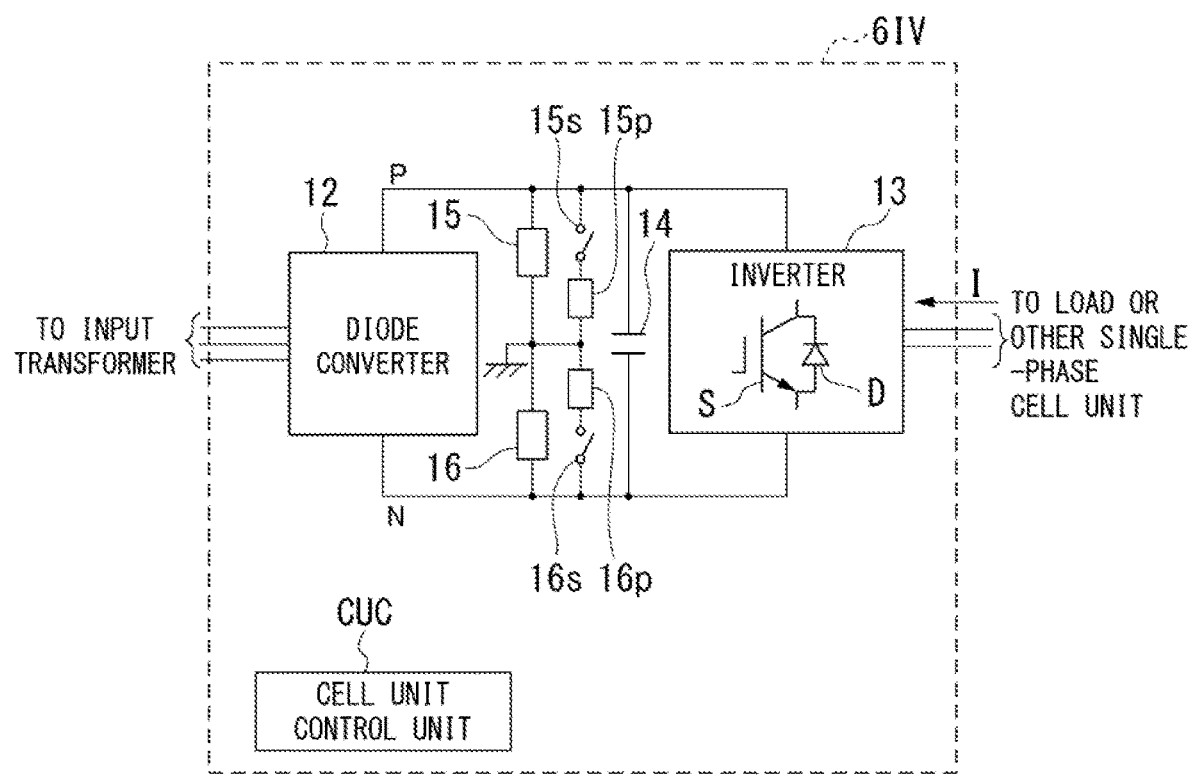
FIG. 4 is a diagram showing a cell unit according to a second embodiment.

A cell unit 6VI shown in FIG. 4 is different from the cell unit 6 shown in FIG. 2 as below. The cell unit 6VI further includes resistors 15P and 16P and switches 15S and 16S.

The resistors 15P and 16P and the switches 15S and 16S are connected in series with each other. Both ends of the resistors 15P and 16P and the switches 15S and 16S connected in series with each other are connected in parallel with the smoothing capacitor 14. For example, when the switch 15S, the resistors 15P and 16P, and the switch 16S are connected in series in this order, one end of each of the switches 15S and 16S becomes both ends of the resistors 15P and 16P and the switches 15S and 16S connected in series with each other. In this case, the connection point of the resistors 15P and 16P is connected to the frame of the cell unit 6VI together with the connection point of the resistors 15 and 16.

The cell unit control unit CUC generates a signal for controlling the switching element 13S constituting the diode converter 12 and the inverter 13 on the basis of the gate pulse signal from the control device 7. Further, the cell unit control unit CUC generates a signal for controlling the switches 15S and 16S on the basis of the control signal from the control device 7.

Additionally, the braking control unit 74 controls the switches 15S and 16S in addition to the control of the circuit breaker 4 and the inverter 13. The braking control unit 74 may control the switches 15S and 16S in accordance with the timing of controlling the circuit breaker 4. For example, the braking control unit 74 may turn on the switches 15S and 16S when turning off the circuit breaker 4 and may turn off the switches 15S and 16S when turning on the circuit breaker 4.

For example, the switches 15S and 16S are normally controlled in an off state by the braking control unit 74 and the resistors 15P and 16P are not loads of the diode converter 12. The switches 15S and 16S are controlled to be turned on by the braking control unit 74 when the regenerative state of the electric motor 3 is detected. Accordingly, the switches 15S and 16S discharge the electric charge accumulated in the smoothing capacitor 14 via the resistors 15P and 16P.

According to the above-described control, the discharge amount in the regenerative state increases. Specifically, the resistance value R of formulas (1) and (2) is a value when the combined resistance value R1 of the resistors 15 and 16 and the combined resistance value R2 of the resistors 15 and 16 are connected in parallel as shown in the following formula (3).

$$R = R1 \times R2/(R1+R2) \qquad (3)$$

According to the above-described embodiment, since it is possible to increase the power loss amount in the regenerative state in addition to the same effect as the first embodiment, it is possible to more efficiently discharge the electric charge accumulated in the smoothing capacitor 14.

According to at least one of the above-described embodiments, the power converter 1 includes the diode converter 12, the inverter 13, the smoothing capacitor 14, the resistors 15 and 16, the current sensor AM, the estimation unit 73, and the braking control unit 74. The diode converter 12 rectifies the alternating current from the AC power supply 2. The inverter 13 is formed such that the DC side is connected to the DC output of the diode converter 12 and the AC side is connected to the load L and includes the switching element 13S which converts the DC power on the DC side into the AC power and the reverse connection diode 13D which is connected in antiparallel with the switching element 13S. The smoothing capacitor 14 is provided in the DC output of the diode converter 12. The resistors 15 and 16 are connected in parallel with the smoothing capacitor 14. The current sensor AM detects the load current flowing between the inverter 13 and the electric motor 3. The estimation unit 73 calculates the DC voltage value Vdc_est on the basis of the current value I detected by the current sensor AM. The braking control unit 74 controls the inverter 13 so that the DC voltage value Vdc_est does not exceed the reference voltage Vdc0 during a period in which the electric motor 3 is in the regenerative state. Accordingly, the power converter 1 can brake the electric motor 3 more quickly.

Although some embodiments of the present invention have been described, these embodiments are presented as examples and are not intended to limit the scope of the present invention. These embodiments can be implemented in various other forms and various omissions, replacements, and changes can be made without departing from the spirit of the present invention. These embodiments and their modifications are included in the present invention described in the claims and the equivalents thereof when they are included in the scope and the gist of the present invention.

REFERENCE SIGNS LIST

1 Power converter
2 AC power supply
3 Electric motor
4 Circuit breaker
5 Input transformer
6 Cell unit
6s Cell units
7 Control device
12 Diode converter
13 Inverter
13S Switching element
13D Reverse connection diode
14 Smoothing capacitor
15, 15P, 16, 16P Resistor
15S, 16S Switch
CUC Cell unit control unit
71 Storage unit
72 Operation control unit
73 Estimation unit
74 Braking control unit
AM, AM1, AM2 Current sensor

The invention claimed is:

1. A power converter comprising:
a diode converter that rectifies an alternating current from a power supply;
an inverter which is formed such that a DC side is connected to a DC output of the diode converter and an AC side is connected to an electric motor and includes a semiconductor switching element converting DC power on the DC side into AC power and a reverse connection diode connected in antiparallel with the semiconductor switching element;
a smoothing capacitor that is provided in the DC output of the diode converter;
a resistor that is connected in parallel with the smoothing capacitor;
a current sensor that detects a load current flowing between the inverter and the electric motor;
an estimation unit that calculates an estimation value of a DC voltage Vdc on the DC side on the basis of a current value I detected by the current sensor; and
a control unit that controls the inverter so that the estimation value of the DC voltage Vdc on the DC side does not exceed a predetermined reference voltage during a period in which the electric motor is in a regenerative state,
wherein the estimation unit calculates the estimation value of the DC voltage Vdc on the DC side on the basis of at least the reference voltage on the DC side, the current value I of the current detected by the current sensor and flowing from the electric motor to the inverter, and a capacity C of the smoothing capacitor, and
wherein the control unit controls a change in the DC voltage Vdc on the basis of the calculated estimation value of the DC voltage Vdc on the DC side.

2. The power converter according to claim 1, further comprising:
a circuit breaker that interrupts power supplied from the power supply to the diode converter on the basis of the control of the control unit,
wherein the control unit opens the circuit breaker at a desired timing associated with braking control of the electric motor.

3. The power converter according to claim 2,
wherein the estimation unit detects an inflow of regenerative energy from the electric motor to the inverter on the basis of the current value I detected by the current sensor, and
wherein the control unit opens the circuit breaker when the inflow of the regenerative energy is detected.

4. The power converter according to claim 1,
wherein the estimation unit calculates the estimation value of the DC voltage Vdc on the DC side on the basis of at least the reference voltage on the DC side, the current value I of the current detected by the current sensor and flowing from the electric motor to the inverter, the capacity C of the smoothing capacitor, and a time constant RC defined on the basis of the capacity C of the smoothing capacitor and a resistance value R of the resistor, and
wherein the control unit controls a change in the DC voltage Vdc on the basis of the calculated estimation value of the DC voltage Vdc on the DC side.

5. The power converter according to claim 1,
wherein the control unit controls the inverter so that more AC power is supplied from the electric motor to the inverter in a range in which the estimation value of the DC voltage Vdc on the DC side does not exceed a reference voltage on the DC side.

6. An electric motor braking method using a power converter including: a diode converter that rectifies an alternating current from a power supply; an inverter which is formed such that a DC side is connected to a DC output on the diode converter and an AC side is connected to an electric motor and includes a semiconductor switching element converting DC power on the DC side into AC power and a reverse connection diode connected in antiparallel with the semiconductor switching element; a smoothing capacitor that is provided in the DC output of the diode converter; a resistor that is connected in parallel with the smoothing capcitor; and a current sensor that detects a load current flowing between the inverter and the electric motor, the electric motor braking method comprising:

calculating an estimation value of a DC volatge Vdc on the DC side on the basis of at least a predetermined reference voltage on the DC side, a current value I of the current detected by the current sensor and flowing from the electric motor to the inverter, and a capacity C of the smoothing capacitor, and controlling the inverter so that the estimation value of the DC voltage Vdc on the DC side does not exceed the reference volatge during a period in which the electric motor is in a regenerative state, controlling a change in the DC voltage Vdc on the basis of the calculated estimation value of the DC voltage Vdc on the DC side.

* * * * *